Figure 1:
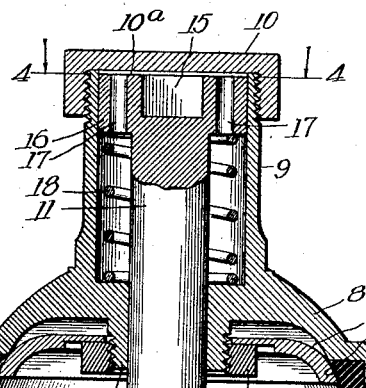

F. H. ELWELL.
PUMP VALVE.
APPLICATION FILED DEC. 1, 1911.

1,082,508.

Patented Dec. 30, 1913.

Witnesses:
Robert H. Weir
Mildred Elsner

Inventor:
Franklin H. Elwell
By Jno. G. Elliott
Atty.

COLUMBIA PLANOGRAPH CO., WASHINGTON, D. C.

UNITED STATES PATENT OFFICE.

FRANKLIN H. ELWELL, OF CHICAGO, ILLINOIS.

PUMP-VALVE.

1,082,508.  Specification of Letters Patent.  Patented Dec. 30, 1913.

Application filed December 1, 1911. Serial No. 663,232.

*To all whom it may concern:*

Be it known that I, FRANKLIN H. ELWELL, a citizen of the United States, and resident of Chicago, in the county of Cook and State of Illinois, have invented certain new and useful Improvements in Pump-Valves, of which the following is a full, clear, and exact specification.

This invention relates to improvements in valves, particularly adapted for steam and other power pumps, the valve structure being inclosed within the hood of the pump, the valve member of which structure has heretofore consisted of a solid disk of quite thick rubber seating upon both the valve seat proper and the hub of the valve seat, the valve being quickly forced to a seated position by a coil spring surrounding the valve stem.

Rubber valves such as above referred to are frequently four inches or more in diameter, and five-eighths of an inch or more in thickness, and are not only objectionably expensive, but must be frequently removed because of the wear they are subjected to from striking on the valve seat proper and the hub end against the spokes supporting the hub into which the valve stem is screwed because of the enormous pressure to which the valve is subjected, and as a result of which seating and striking it is practically impossible to maintain a tight joint between the valve and its seat proper, owing to the unequal compression of the rubber of the valve on its seats and against the spokes. Furthermore, the springs of these prior valves so quickly move the valve to contact with its seat that together with the enormous pressure to which the valve is subjected, the valve is pounded upon its seat to an objectionable degree, correspondingly decreasing the durability of its wear because of the then impossibility of maintaining as must be a tight joint between the valve and its seat proper.

The prime object of my invention is to avoid the necessity of use and objectionable cost of solid rubber disk valves in pumps and eliminating these objections by a construction provided for the successful use of a gasket of rubber, soft metal or other composition, and thereby have but one seat and one joint for the valve, and at the same time employ substantially less rubber than heretofore, and enable the use of purer rubber at substantially less cost, and therefore a quality of rubber operating with greater advantage and durability than is possible and practical with the solid rubber valve disk heretofore employed.

A further object of my invention is to provide for the employment of a gasket of rubber, or soft metal, or other yielding composition, and particularly the first, which may be inserted to place and removed therefrom with ease and facility for the substitution of a new gasket, and which when in use will serve to form a close joint of maximum resiliency for the seating of the valve.

Another object of my invention is a valve construction in which the water contained in the structure may be utilized to operate automatically for preventing the valve from pounding on its seat through the action of its spring and by back pressure of water as heretofore.

A still further object is to have a valve structure in which my invention finds embodiment, occupy a minimum vertical space whereby it is adapted to be conveniently inserted in pumps, the hoods of which are very low, and to be of the simplest possible construction both in cost of making and amount of metal employed.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

Figure 4:
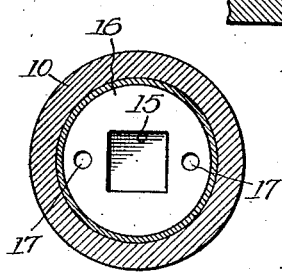
Figure 7:
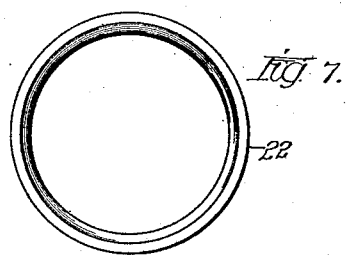
Figure 3:
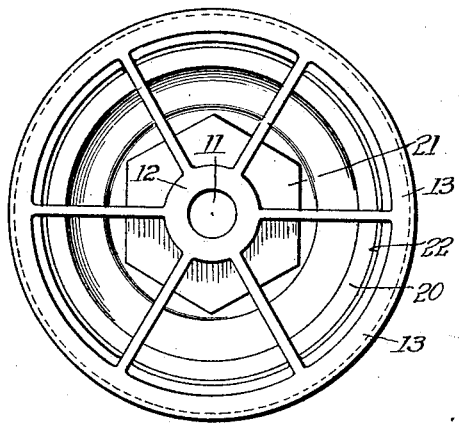
Figure 2:
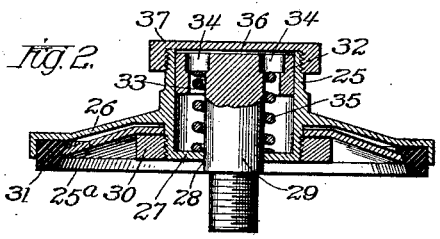
Figure 5:
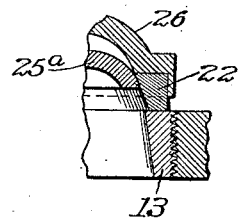
Figure 6:
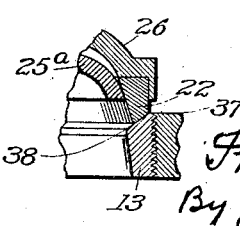

In said drawing: Figure 1 illustrates a vertical longitudinal section of a valve structure in which my invention finds embodiment. Fig. 2 is a modified form thereof. Fig. 3 is a bottom plan of the valve shown in Fig. 1. Fig. 4 is a section on the line 4, 4 of Fig. 1 looking in the direction indicated by the arrows. Fig. 5 is a detail section of the valve shown in Fig. 1. Fig. 6 is a detail section illustrating a modification of the gasket and the valve seat shown in Figs. 1 and 2, and Fig. 7 is a reduced bottom plan view of the gasket.

Similar characters of reference indicate the same parts in the several figures of the drawing.

The valve structure in Fig. 1 consists of a dome-like body 8 and a cylindrical casing 9 preferably cast with or turned with the dome 8, the upper end of the cylindrical casing 9 being closed by a screw cap 10, the inner wall of which cap terminates, as indicated at 10$^a$, in a plane above the stem 11 screwed into the hub 12 of a valve seat 13. The stem 11 is screw threaded into the hub 12, as indicated at 14, and provided at its upper end with an annular recess 15, for the reception of a wrench tightening it in the hub, and is provided with a fixed piston 16, which may be formed integrally therewith bearing and slidable against the walls of the casing 9, the said piston being provided with perforations 17 diametrically therethrough for purposes hereinafter described. The dome portion 8 is slidable on the stem 11, and the valve normally, tightly seats by gravity, but may be, and preferably is accelerated from its unseated toward its seated position by means of a spring 18 inclosed by the casing 9 bearing at its upper end against the fixed piston 16, and at its lower end against the top of the dome. Projecting downwardly from the dome is a screw threaded boss 19 on and against a shoulder of which is seated a concave circular valve plate 20 locked in its operative position by an octagonal nut 21 screwed on the boss, which plate 20 by its form, serves to confine a rubber or soft metal gasket 22, between the outer edge or face 23 and a flange 24 depending from the dome 8. The gasket 22, whether of rubber or metal, is shown in the drawings to be substantially triangular in cross section, but truncated on its underside contacting with the seat 13, but obviously may be of any other form in cross section, adapting it to perform the function hereinafter described.

With a construction such as above described, it will now be apparent that for the insertion or subsequent removal for any cause of the gasket 22, it is only necessary to unscrew the valve stem 11 from the hub 12, remove the nut 21 and the valve plate 20 and then upon removing the gasket replace it, or substitute another to the position it is shown to occupy, slip the valve plate back to its place and tighten the nut until the gasket is held firmly between the valve plate and the rim 24 of the valve structure dome, and furthermore that by my invention I am enabled to successfully use a valve packing or seating portion containing substantially less material than heretofore, correspondingly less in cost, and at the same time maintain a joint of maximum resiliency and tightness between a valve and its seat.

In Fig. 2 is shown a modified form of construction in which my invention finds embodiment, and by means of which the height of the valve is substantially shortened to adapt it for insertion within pump hoods of the shortest depth and by the use of a minimum amount of material and cost of production. In this modified form of my invention the casing 25 is about half the height of the casing 9 shown in Fig. 1 and projects through and beyond the dome 26, and has a bottom plate 27 provided with a perforation 28 forming a bearing for the valve stem 29, the lower projecting end of the casing 25 being screw threaded to receive a nut 30 impinging against the valve plate 25$^a$, and locking the valve gasket 31, against the dome. As in Fig. 1 there is secured to, or formed with the valve stem 29 a fixed piston 32 provided with an annular groove 33, bisecting which at opposite points are perforations 34, for the reception of a pin wrench (not shown) for tightening the stem on its seat, the annular groove making it possible and practical to set therein the upper end of a coiled spring 35 bearing at the lower end against the bottom 27 of the casing, and this without obstructing a flow of water through the perforations 34 into the space 36 between the cap 37 and the upper end of the fixed piston 32, as in Fig. 1. With the annular groove 33 and the perforations 34, as above described, two results are accomplished, one of which is that the upper end of the spring may be projected against the end wall of the annular groove without obstructing the passage of water through the fixed piston, and another is that on the unseating of the valve, the spring may be compressed into the annular groove and thereby enable the corresponding reduction in the height of the valve structure, without modifying its operation as compared with that shown in Fig. 1. In other words, the structure shown in Fig. 2 provides for the construction of a valve of my invention of the lowest possible height and whereby it may be conveniently inserted in the shallowest of pump hoods.

When in operation the casing 9 is full of water which seeps through between the valve stem and the hub portion of the valve, and it will therefore, now be observed with the valve seated the unseating of the valve will operate to force water from the lower part of the casing through the perforations 17 in Fig. 1 and 33 and 34 in Fig. 2 into the existing and gradually enlarging chamber 10$^a$, above the fixed piston of the valve stem, which water as the valve moves toward a seated position exerts a yielding resistance by passing downward through the perforation of the fixed piston, and thereby operates to prevent a too quick action of the valve, by the force of pressures otherwise impelling the valve, either by gravity or the action of the spring, to strike with a force hammering the valve upon its seat. In other words, with the escaping of the water through the piston perforations from the lower to the upper piston chamber during the descent of the valve toward its seat, the water in the upper chamber is not only relieved of a pressure otherwise preventing the valve from seating, but forms a uniform yielding resistance cushioning the valve from hammering on its seat, during and throughout any changes of pressure to which the valve may be subjected when in operation. In this connection it will now be observed, that the drawings show the distance between the metal edge of the valve and its seat is made greater than the distance between the cap 10 and the piston 16, whereby the metal edge of the valve is not only prevented from striking its seat when the old gasket is so worn down as to require the substitution of a new gasket, but that thereby the sound of the cap striking the piston furnishes the operator with an audible signal indicating that the valve is not seating tight, and that a renewal of the gasket is then necessary.

Figs. 5 and 6 indicate the employment of a gasket of soft metal, or other resilient composition, and Fig. 6 shows a modification in the form of the contacting edge of the valve and seat in that the valve edge 37 and the edge of its seat 38 are inclined.

It should be understood, however, that my invention is not limited to the exact details of construction herein shown, and before described, for my invention will find embodiment in any valve structure in which it is practical to utilize a water chamber in the valve structure adapted to form a yielding cushion preventing a valve from hammering on its seat, nor is my invention limited to the specific means shown and described for retaining in its operative position the gasket of the valve so long as the gasket is thus held against accidental detachment nor to the means shown and described for preventing the metal edge of the valve structure from striking the valve seat when the gasket is too much worn off for further use, for any stock device which will subserve the same purpose will be within the spirit of my invention.

Having described my invention, what I claim and desire to secure by Letters Patent is:

1. A valve structure comprising in combination a dome-like portion, a gasket in and projecting below the outer end thereof, a hub permanently in a plane above the valve seat, a clamping plate for the gasket on said hub, and means for tightening the same, a valve stem on which said hub is free to reciprocate, a substantially closed water chamber surrounding said valve stem, a piston in said chamber provided with perforations through which water circulates during both the seating and unseating of the valve, and whereby the valve is cushioned against hammering on its seat.

2. A valve structure comprising in combination a reciprocating member, a stem on which said member is free to reciprocate, a gasket secured to said valve member and projecting therefrom, a water chamber surrounding said stem, a piston secured thereon, means for providing for a circulation of water through said piston, and a convolute spring surrounding said stem and confined between the piston and the end wall of said water chamber for actuating the valve toward its seated position.

3. A valve structure comprising in combination a removable fixed valve stem, a water chamber surrounding said stem, a flange member projecting outwardly beyond the walls of the water chamber, a gasket and means securing said gasket to the flange member at a point surrounding and opposing the valve seat, a screw cap closing the water chamber, a piston on said stem and perforations in said piston providing for a circulation of water confined in the water chamber.

4. A valve structure comprising in combination a fixed stem, a water chamber surrounding said stem, a piston secured to the stem provided with perforations for a circulation therethrough of water confined in said chamber, a cap closing the water chamber, a valve flange, a gasket secured thereto, and means whereby the lower edge of said valve flange is permanently maintained in a plane above the seat for the valve, substantially as and for the purpose described.

5. A valve structure comprising in combination a stationary stem, a water chamber surrounding said stem, a piston secured to said stem provided on its underside with an annular groove, perforations through the upper face of the piston bisecting said annular groove, a valve flange integral with the wall of the water chamber, a seating gasket, a valve plate and means for adjustably securing the gasket to the flange, a convolute spring surrounding the valve stem for actuating the valve toward its seat, a portion of which spring is compressible within the annular groove of the piston on the seating of the valve, substantially as and for the purpose described.

6. A valve structure comprising in combination, a valve body, a gasket secured to and projecting below the periphery of said body and supporting the valve structure entirely above its seat, a valve stem, a piston provided with perforations therethrough, a closed water chamber surrounding said piston, the distance between which piston and the opposing closed end of the water chamber is less than between the valve body and its seat whereby the metal portion of the valve body is prevented from contact with the seat and the upper end of the water chamber strikes against the piston on the wearing away of the gasket, substantially as and for the purpose described.

In witness whereof, I have hereunto set my hand and affixed my seal, this 28th day of November A. D. 1911.

FRANKLIN H. ELWELL. [L. S.]

Witnesses:
 JNO. G. ELLIOTT,
 MILDRED ELSNER.

---

Copies of this patent may be obtained for five cents each, by addressing the "Commissioner of Patents, Washington, D. C."